United States Patent [19]

Foster

[11] Patent Number: 5,482,155
[45] Date of Patent: Jan. 9, 1996

[54] RECIPROCATING FLOOR CONVEYOR AND FLOOR MEMBER

[76] Inventor: Raymond K. Foster, P.O. Box 1, Madras, Oreg. 97741

[21] Appl. No.: 390,759

[22] Filed: Feb. 17, 1995

Related U.S. Application Data

[63] Continuation-in-part of Ser. No. 304,404, Sep. 12, 1994, Pat. No. 5,415,271.

[51] Int. Cl.$^6$ .................................................. B65G 25/04
[52] U.S. Cl. ...................................... 198/750.2; 198/750.3
[58] Field of Search ............................ 198/750.2, 750.3, 198/750.4, 750.5, 750.6; 414/525.1

[56] References Cited

U.S. PATENT DOCUMENTS

| | | | |
|---|---|---|---|
| 4,474,285 | 10/1984 | Foster | 198/750 |
| 4,748,893 | 6/1988 | Foster | 91/176 |
| 4,785,929 | 11/1988 | Foster | 198/750 |
| 4,896,761 | 1/1990 | Foster | 198/750 |
| 5,125,502 | 6/1992 | Foster | 198/750.5 X |
| 5,139,133 | 8/1992 | Foster | 198/750.4 X |
| 5,193,661 | 3/1993 | Foster | 198/750 |
| 5,222,593 | 6/1993 | Quaeck | 198/750.5 |
| 5,238,360 | 8/1993 | Foster | 198/750.4 X |
| 5,310,044 | 5/1994 | Quaeck | 198/750.5 |
| 5,325,763 | 7/1994 | Foster | 91/422 |
| 5,350,054 | 9/1994 | Foster | 198/750 |
| 5,415,271 | 5/1995 | Foster | 198/750.3 |
| 5,419,426 | 5/1995 | Foster | 198/750.4 |

Primary Examiner—D. Glenn Dayoan
Attorney, Agent, or Firm—Delbert J. Barnard; Kathleen T. Petrich; Joan H. Pauly

[57] ABSTRACT

A floor slat member (10) having longitudinally extending first and second sidewalls (32, 34) of a reciprocating floor conveyor includes integrally formed first downwardly opening channel portion (36), having a top panel (40), laterally extending side flange (76) and the first sidewall (32), and an adjacent upwardly opening channel portion ( 38 ), having a channel wall (68) and second sidewall (34). The side flange (76) overhangs second sidewall (34) of an adjacent floor slat member (10'). An elongated seal member (72) carried by the second sidewall (34 ) in a channel ( 74 ) extends upwardly contacting a seal member receiving surface (78) on the first sidewall (32). An alternate embodiment has a seal receiving surface (78') on side flange (76). A central leg portion (52) extending longitudinally of floor slat member (10) and laterally between first and second sidewalls (32, 34) and connecting portion of first and second channel portions (36, 38) forms an I-beam (60) for strength and stability of the floor slat member. Abrasive debris/particulates (82) are kept clear of elongated seal member (72) via an angle of repose (84) of the debris/particulates (82) in a narrow vertical gap (80) formed by side flange (76) and second sidewall (34). A tubular extension (102) glides through a slide bearing (104), which is fixedly attached to transverse frame members (26), provides alignment and support to hydraulic motor (M) during movement back and forth of floor slat members (10, 11).

20 Claims, 10 Drawing Sheets

RECIPROCATING FLOOR CONVEYOR AND FLOOR MEMBER

RELATED APPLICATION

This is a continuation-in-part of my U.S. application Ser. No. 08/304,404, filed Sep. 12, 1994, and entitled "Reciprocating Floor Conveyor with Overlay Protection Plate", now U.S. Pat. No. 5,415,271.

TECHNICAL FIELD

This invention relates to reciprocating floor conveyors. More particularly, it relates to the provision of floor slat members for such conveyors which are adapted to collect particulate material in upwardly opening channel portions of such members and which use the angle of repose of such material to restrain movement of such material into a region where a seal member on a first floor member makes sealing contact with a seal member receiving surface on the adjacent floor member.

BACKGROUND INFORMATION

Reciprocating floor conveyors are used to facilitate removal of garbage and other bulk material from containers which are transported to a landfill or other receiving site. My U.S. Pat. No. 4,785,929, granted Nov. 22, 1988, and entitled, "Bearing System for Reciprocating Floor Conveyor," discloses a floor member and support bearing for a reciprocating floor conveyor that has been used in garbage collection containers. My U.S. Pat. No. 5,325,763 granted Jul. 5, 1994, and entitled, "Internal Check Valve," discloses a hydraulic drive assembly suitable for powering the reciprocating floor conveyor, and a desired sequence of operation.

Elongated seal strips that run the length of the floor members have been used to keep out debris and to keep material from sifting downwardly between the conveyor slats. My U.S. Pat. No. 4,896,761, granted Jan. 30, 1990, and entitled, "Reciprocating Conveyor Floor Members and Seals," discloses a side lip to protect the seal from abrasive debris which allows the floor members to be closely confronting and still retain a flexible seal to make the reciprocating floor conveyor effectively impervious. However, abrasive debris may still come into close proximity to the seals. It has been discovered that for some applications, the seals may need further protection from abrasive material.

A principal object of the present invention is to provide a unique floor slat member for a reciprocating floor conveyor, adapted so that in the conveyor each floor member overhangs a similar adjacent floor member and better protects the seals from abrasive particulate material.

DISCLOSURE OF THE INVENTION

The present invention provides an improved elongated floor slat member for a reciprocating floor conveyor. The elongated floor slat member comprises a first sidewall, an oppositely situated second sidewall and integrally formed first and second channel portions. The first channel portion opens downwardly and includes a seal receiving surface at the first sidewall. The second channel portion opens upwardly and includes a bottom surface for holding/carrying material and a seal member at the second sidewall.

In preferred form, the elongated floor slat member includes a generally vertical leg extending longitudinally from the floor slat member and laterally between the first and second sidewalls. The generally vertical leg and the first sidewall each include confronting, laterally inwardly projecting bottom flanges which are in coplanar parallelism. The bottom flanges are vertically offset below and parallel with a bottom panel of the second channel portion.

Another aspect of this invention includes providing the floor slat member with a laterally projecting side flange that extends laterally outwardly from a top panel of the first channel, outwardly beyond the first sidewall. A seal member receiving surface is below the side flange. An elongated seal member is supported on the second sidewall and extends into sealing contact with the seal member receiving surface of an adjacent floor member. The side flange of a first elongated floor slat member overhangs the second sidewall and the seal member of a second elongated floor slat member. The seal member of the second elongated floor slat member contacts the seal member receiving surface of the first elongated floor slat member.

In preferred form, the side flange slopes downwardly and outwardly from the top of the first sidewall. The top panel extends laterally from the top of the web in the opposite direction of the first channel to a connection with the second channel.

In another preferred form, the bottom of the web has a bottom flange extending perpendicular to the web. The leg portion and the top panel of the first channel portion together form an I-beam extending longitudinally of the floor slat member.

In preferred form, the seal member receiving surface is a lower surface on the first sidewall. In an alternate embodiment, the seal member receiving surface is a lower surface on the side flange. The second sidewall includes an elongated seal member retaining channel with a lower portion of the elongated seal member received within the retaining channel.

Another aspect of the invention includes providing a plurality of elongated floor slat members that are advanced in a first direction to convey a load and are retracted in the opposite direction. Each elongated floor slat member is supported on a plurality of support bearings, which are received within the downwardly opening channel space of the first channel portion. The support bearings contact a bottom surface of the top panel and a bottom surface of the bottom panel. The support bearings are supported on a plurality of guide beams.

Another aspect of the invention includes providing a floor slat construction which uses the angle of repose of the particulate material for restraining such material from upward movement into a narrow gap defined vertically between the side flange and the second sidewall of the adjacent elongated floor slat member.

Another aspect of the invention includes providing an alignment and support means for each of the hydraulic drive units which drive the elongated floor slat members.

The main advantages of this invention are: 1) the strength of the one-piece floor slat member that has an I-beam central support for carrying particulates, garbage, debris and other heavy loads; 2) the overhanging side flange in conjunction with the adjacent floor slat member's sidewall adds protection to the elongated seal member; 3) the material is restrained from entering a gap between the side flange and the adjacent floor slat member's sidewall by an angle of repose of the material; 4) there is a receptacle for storing and carrying liquids that drains from the solid material; and 5) improved alignment and support for the hydraulic drive units.

These and other advantages and features will become apparent from a review of the following detailed description of the best mode for carrying out the invention, the drawing, and the claims, all of which comprise the disclosure of the present invention and are included herein by reference.

BRIEF DESCRIPTION OF THE DRAWING

Like reference numerals are used to designate like parts through out the several views of the drawing, and.

BEST MODE FOR CARRYING OUT THE INVENTION

The reciprocating floor conveyor of the present invention includes conveyor slats or floor members that are moved in one direction to advance a load and are retracted in the opposite direction. In preferred form, the floor members are divided into three sets. All of the floor members are moved in unison in a first direction to advance the load. The floor members are then retracted one set at a time in the opposite direction until all floor members are back at a "start" position. The operation is then repeated. The present invention may also be used in a reciprocating floor conveyor in which more than one half of the floor members are always advancing while the remaining floor members are returning at a higher rate of speed. Further, the present invention can be used for reciprocating floor conveyors having any sequence of operation.

The reciprocating floor conveyor utilizes a drive mechanism for reciprocating the floor members that may be like either the drive mechanism set forth in my aforementioned U.S. Pat. No. 5,325,763 or in my U.S. Pat. No. 4,748,893, granted Jan. 7, 1988, and entitled, "Drive/Frame Assembly for a Reciprocating Floor," for example.

The conveyor frame is composed of longitudinally spaced apart transverse frame members, sometimes referred to as "sills," which serve to support and guide the floor members and longitudinal frame members to which the transverse frame members are connected. Examples of the conveyor frame are set forth in my U.S. Pat. No. 4,474,285, granted Oct. 2, 1984, entitled, "Drive Unit Mount for Reciprocating Floor Conveyor," and in my U.S. Pat. No. 5,350,054, granted Sep. 27, 1994, and entitled, "Ball Block for Mounting Linear Motor."

In prior art conveyors, the floor slat members are supported by and move on a plurality of bearings, which, in turn, are mounted on a plurality of longitudinal guide beams. Conveyors constructed according to the present invention utilize guide beams and a bearing which is part of the prior art, but in combination with a new floor slat configuration, and a new bearing as discussed in more detail later.

Figure 1:
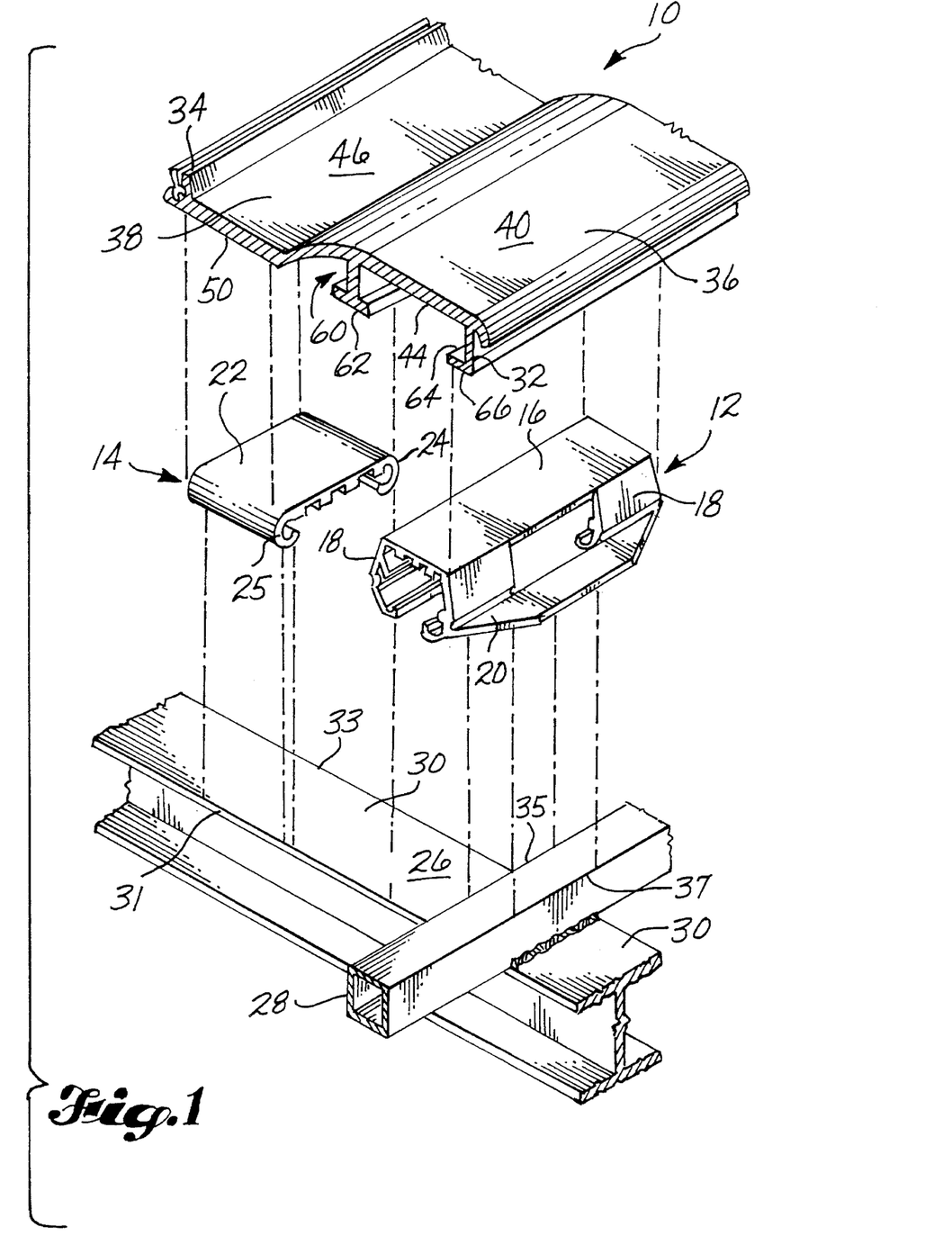
FIG. 1 is an exploded fragmentary pictorial view of two slide bearings spaced above a guide beam and a floor slat member spaced above the bearings.
Figure 2:
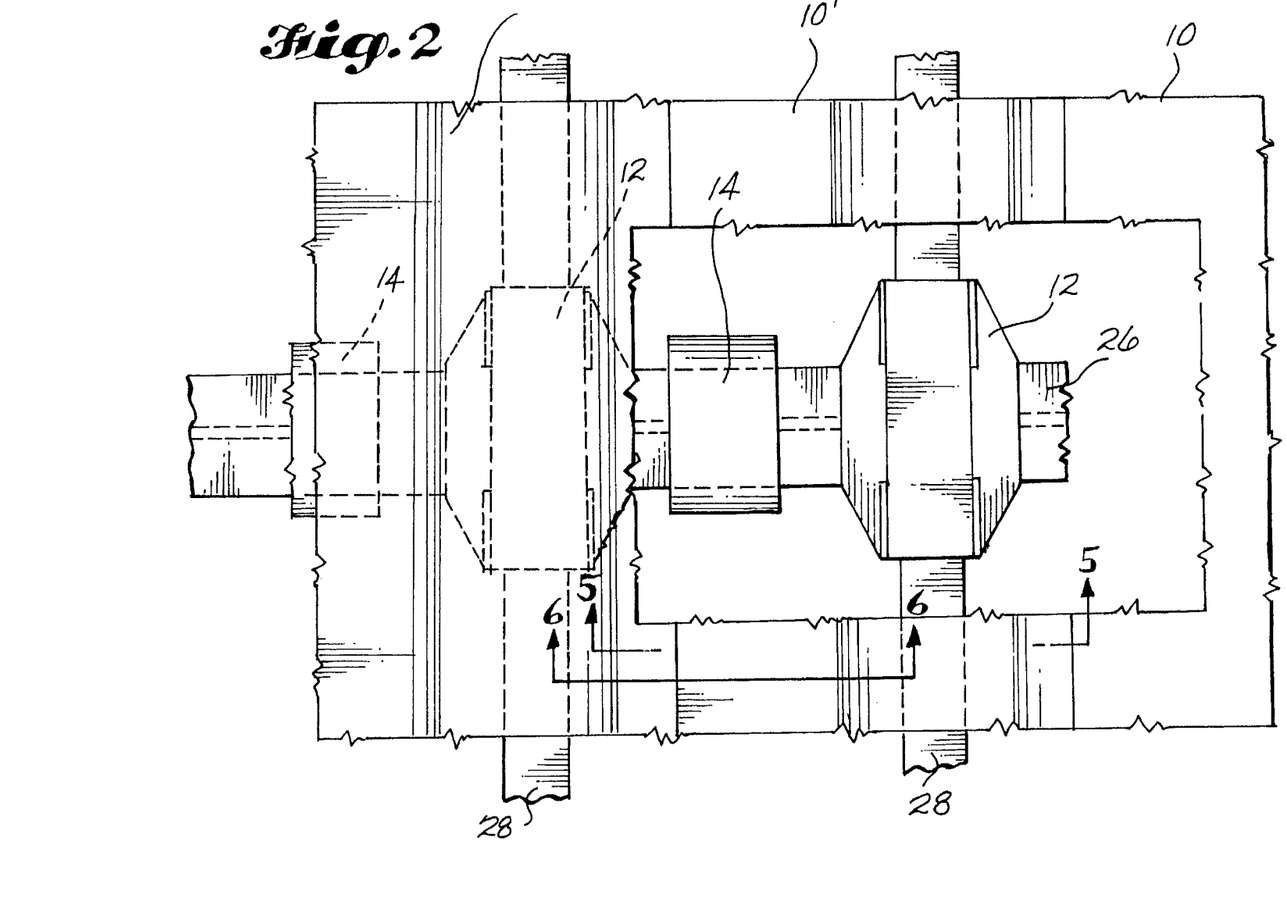
FIG. 2 is a fragmentary top plan view of adjacent floor slat members, with portions of floor slat members cut away to disclose the two slide bearings.
Figure 3:
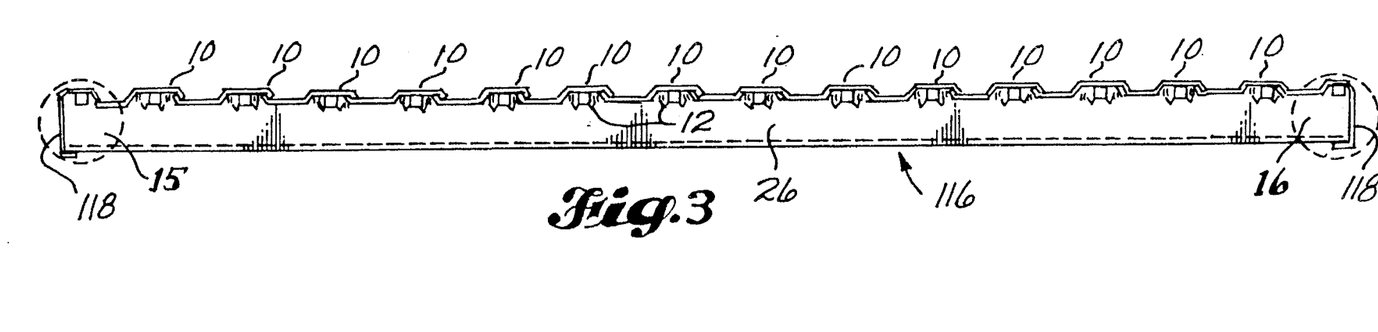
FIG. 3 is a full-width end elevational view of the floor slat members attached to a floor frame.

Referring to FIGS. 1–3, the conveyor floor comprises a plurality of side-by-side floor slat members 10, each of which rides on a pair of bearings 12, 14. In preferred form, the bearings 12, 14 are snap fitted onto portions of the framework. Large bearing 12 is preferably like the bearings disclosed in FIGS. 11–15 of my aforementioned U.S. Pat.

Figure 4:
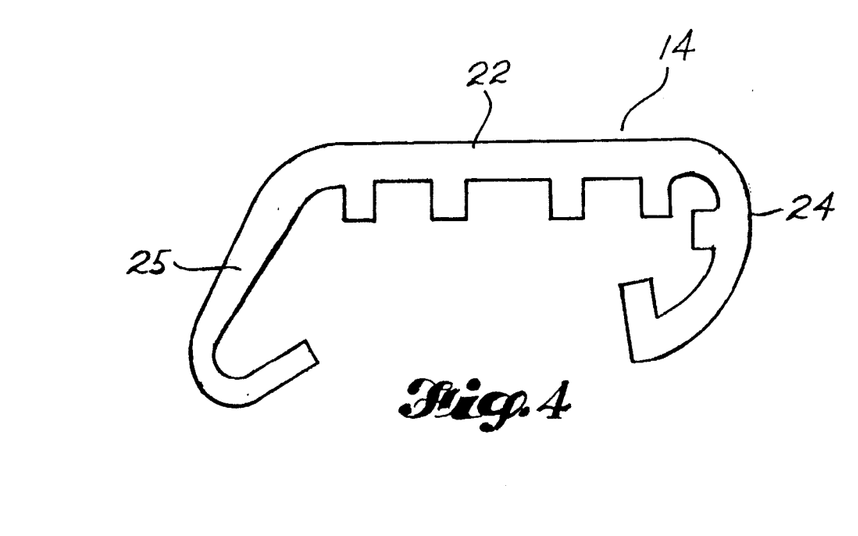
FIG. 4 is an end elevational view of the preferred embodiment of one of the slide bearings.

No. 4,785,929. It includes a top portion 16, a pair of sidewalls 18, and a pair of wings 20 that extend perpendicularly from sidewalls 18. Small bearing 14 is a new design and has a top portion 22 and a pair of inwardly curving hook portions 24,. 25. FIG. 4 depicts an alternate and preferred embodiment of small bearing 14.

The framework members important to this invention are a plurality of transverse frame members 26 and a plurality of longitudinal guide beams 28. Transverse frame members 26 are spaced apart longitudinally of the conveyor in the manner disclosed by my aforementioned U.S. Pat. No. 4,474,285, for example. In preferred form, longitudinal guide beams 28 are square tubular members and may measure one inch by one inch in cross-section, although other shapes or sizes may be used. The guide beams 28 mount perpendicularly to transverse frame members 26 and are welded to an upper flange 30, as is shown in FIG. 1. Transverse frame member 26 is shown as an I-beam member, but may be other shapes, such as tubular, channel-shaped, or Z-shaped. Small bearing 14 snaps on to upper flange 30 at 31, 33. Large bearing 12 snaps on guide beam 28 at 35, 37.

Figure 5:
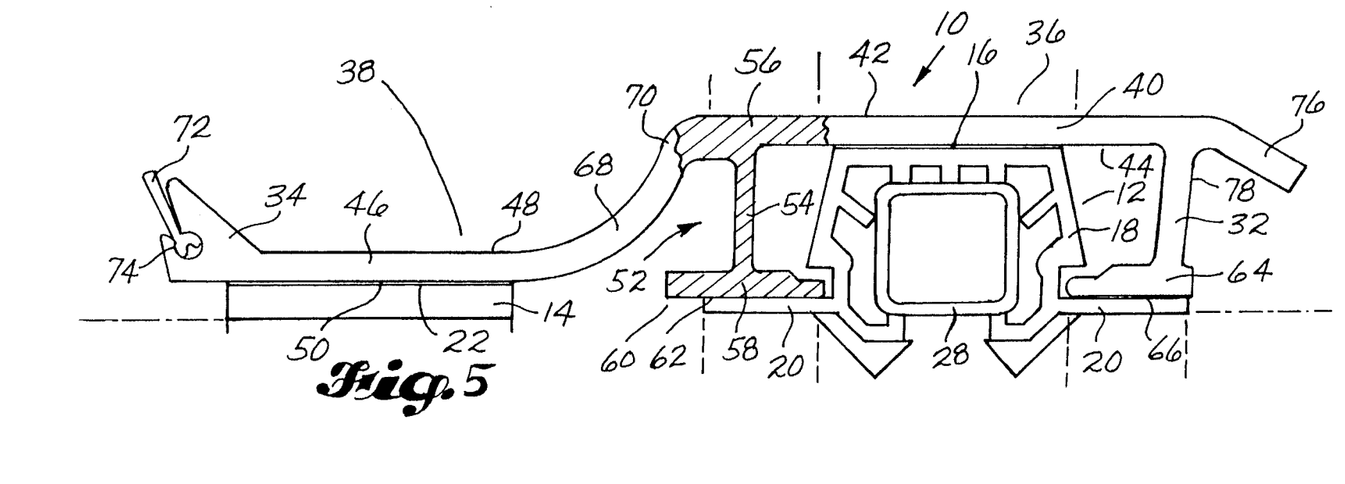
FIG. 5 is an end elevational view of a floor slat member and its slide bearings and guide beam, taken substantially along line 5—5 of FIG. 2, with an I-beam portion shown in section.

Referring to FIG. 5, each floor slat member 10 includes a first sidewall 32 and an oppositely situated and laterally spaced second sidewall 34. Between first and second sidewalls 32, 34 are integrally-formed first and second channel portions 36, 38. First channel portion 36 is downwardly opening and includes a top panel 40 having a top surface 42 and a bottom surface 44. Second channel portion 38 is upwardly opening and has a bottom panel 46 formed integrally with second sidewall 34. Bottom panel 46 includes a top surface 48 and a bottom surface 50. A generally vertical leg 52 extends longitudinally of first and second channel portions 36, 38 and laterally between the first and second sidewalls 32, 34. Leg 52 includes a generally vertical web 54, a top portion 56, which is an extension of top panel 40 and is generally perpendicular to web 54, and bottom flange 58, which is also generally perpendicular to web 54 and at the opposite end of top portion 56. The top portion 56, the web 54, and bottom flange 58 form essentially an I-beam 60, which adds structural support and strength to the floor slat members. Bottom flange 58, having a bottom surface 62, extends laterally in both directions from web 54.

First sidewall 32 includes a bottom flange 64 having a bottom surface 66. Flange 64 extends laterally and generally perpendicularly from first sidewall 32. Bottom surface 66 of first sidewall 32 is coplanar and parallel to bottom surface 62 of flange 58. A generally central, curved channel wall 68 is positioned between bottom panel 46 and top portion 56 of web 54. Second channel portion 38 comprises channel wall 68, bottom panel 46 and second sidewall 38. Channel wall 68 joins top panel 40 at top portion 56 of I-beam 60 at a transition region 70. Channel wall 68 curves outwardly then downwardly from the top panel into the channel wall 68.

Second sidewall 34 holds a flexible, elongated seal member 72. Elongated seal member 72 is positioned inside a narrow channel 74 inside second sidewall 34. The elongated seal member is made of an elastomeric material and may include two legs at one end for better fit in the narrow channel, like the seal member described in my U.S. Pat. No. 4,896,761, granted Jan. 30, 1990, and entitled, "Reciprocating Conveyor Floor Members and Seals."

The top panel 40 extends laterally past first sidewall 32 to form a side flange 76. Side flange 76 extends downwardly and outwardly to extend over both second sidewall 34 and elongated seal member 72 of adjacent floor member 10', better depicted in FIGS. 6–8. Elongated seal member 72 contacts a seal member receiving surface 78. Referring to FIG. 7, seal member receiving surface 78 is a surface below side flange 76, and on the first sidewall 32. An alternate embodiment of seal member receiving surface 78 is shown in FIG. 8, where seal member 72 contacts a seal receiving surface 78' of side flange 76.

Referring to FIGS. 1 and 5 again, in assembled condition, floor slat member 10 rests on bearings 12, 14. Specifically, bottom surface 44 of top panel 40 rests on top portion 16 of bearing 12. Bottom surface 50 of bottom panel 46 rests on top portion 22 of small bearing 14. Bottom surfaces 62, 66 of I-beam 60 and first sidewall bottom flange 64, respectively, rest directly on or are slightly above wings 20 of large bearing 12. Wings 20 provide mutual bracing. When installed, bottom surface 50 of bottom panel 46 is in offset parallelism with bottom surfaces 62 and 66, as shown in FIG. 5.

Referring again to FIG. 6, side flange 76 overhangs second sidewall 34 and elongated seal member 72 to form a narrow generally vertical gap 80. Gap 80 is defined by and vertically between side flange 76 and second sidewall 34. The side flange 76 protects the elongated seal member from solid particulates and liquids by blocking the particulates from direct access to the elongated seal member 72. Referring also to FIGS. 7–8, particulates 82 on top of floor slat members 10 form an angle of repose at 84. Because of the position of the side flange 76 over the second sidewall 34, particulates 82 generally do not come into contact with the elongated seal member 72, thereby adding extra sealing security and lengthened life for the seal.

Figure 9:
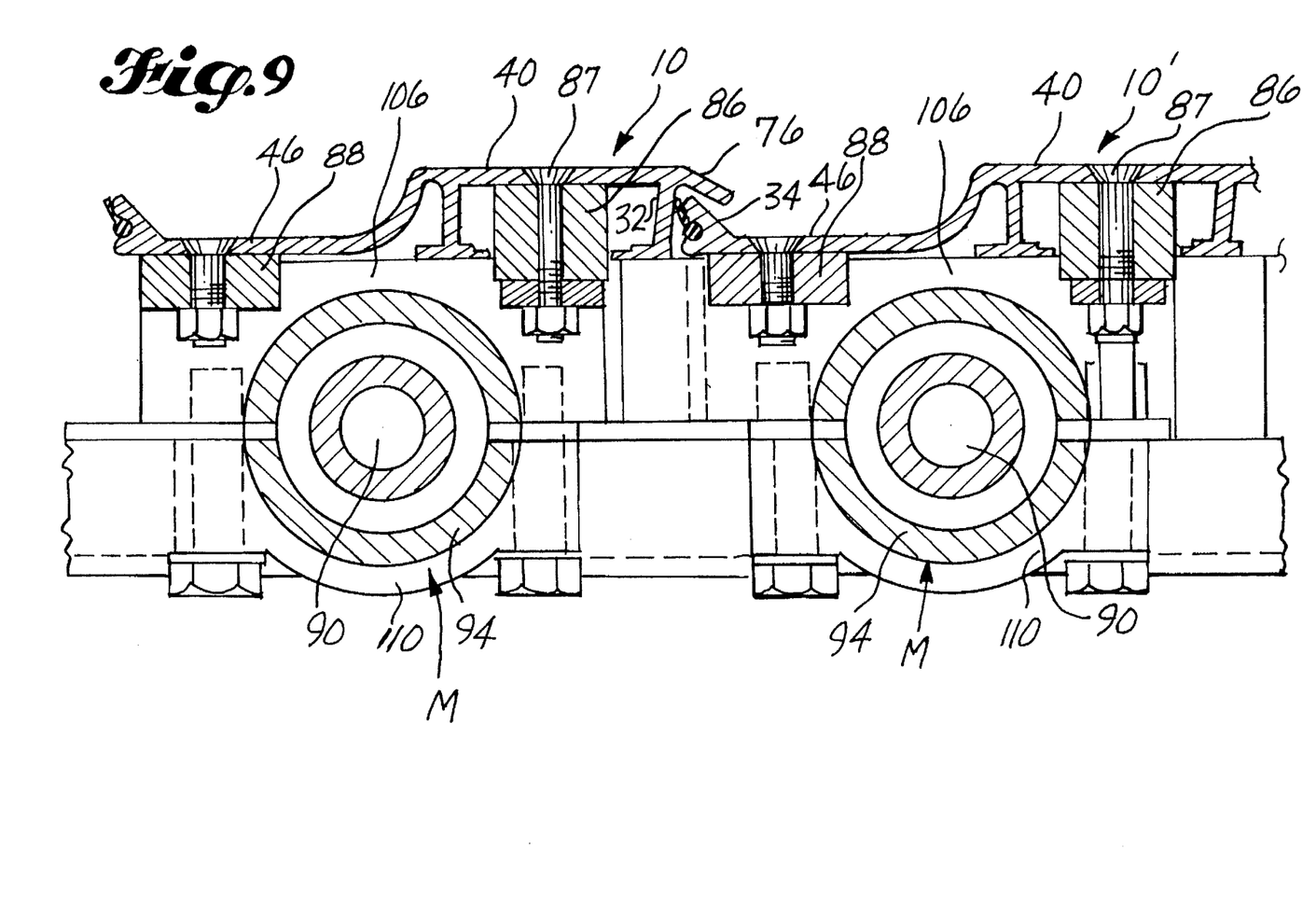
FIG. 9 is an enlarged scale fragmentary sectional view taken substantially along lines 9—9 of FIG. 10, depicting each floor slat member attached to a separate linear hydraulic motor.

Referring to FIG. 9, each floor slat member 10 is connected to a linear hydraulic motor M via an large elongated shoe pad 86 and a small elongated shoe pad 88. Top panel 40 mounts to the large shoe pad 86. Bottom panel 46 mounts to the small shoe pad 88. In preferred form, the top and bottom panels are bolted with countersunk bolts 87 to the large and small shoe pads 86, 88, respectively.

Figure 10:
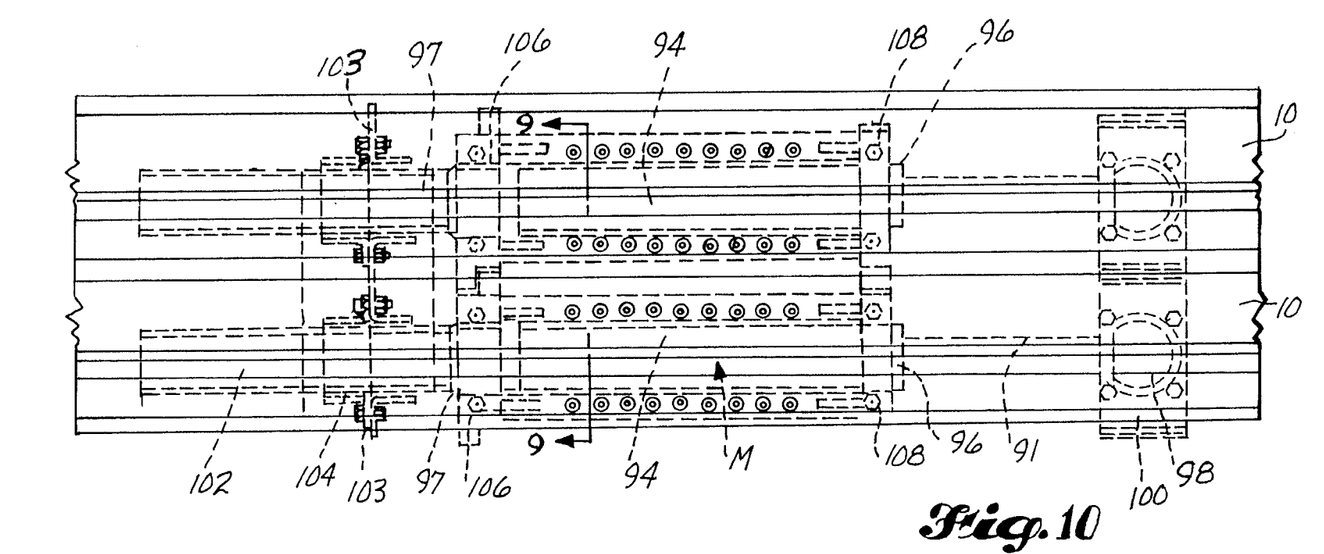
FIG. 10 is a fragmentary top plan view of two adjacent floor slat members depicting the drive attachment to the floor slat members shown in dashed lines.
Figure 11:
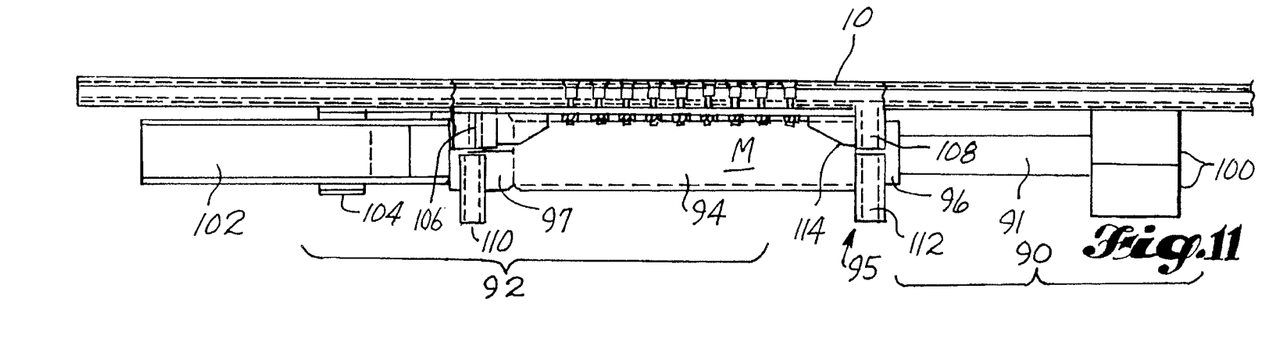
FIG. 11 is a side elevational view of the adjacent floor slat member and drive attachments of FIG. 10.

Referring also to FIGS. 10 and 11, motor M is an extensible-length piston-cylinder unit having a piston component 90, which includes a piston rod 91, that is fixedly connected to the framework (not shown) and a movable portion 92 that moves with the floor slat members 10. Movable portion 92 includes a cylinder barrel 94 and a cylinder head 96, through which the piston rod 91 extends. The outer end of piston 90 includes a ball end 98 and is supported by a ball socket (not shown) within a two-part housing 100. The two-part housing 100 forms the socket and the socket securely holds ball end 98 in place and prevents relative longitudinal movement.

At the other end of cylinder barrel 94 is a cylinder plug 97 and a tubular extension 102. Tubular extension 102 extends through a slide bearing 104 and at one end is connected to cylinder plug 97. Slide bearing 104 is secured to a portion of the framework (not shown) via a plurality of bolted clamps 103 (shown in dashed lines in FIG. 10), although other attachment means may be used. Slide bearing 104 guides tubular extension 102 so as to restrict cylinder barrel 94 to linear, reciprocating movement. Tubular extension 102 in conjunction with slide bearing 104 also provides structural support to motor M.

Figures 12, 13:
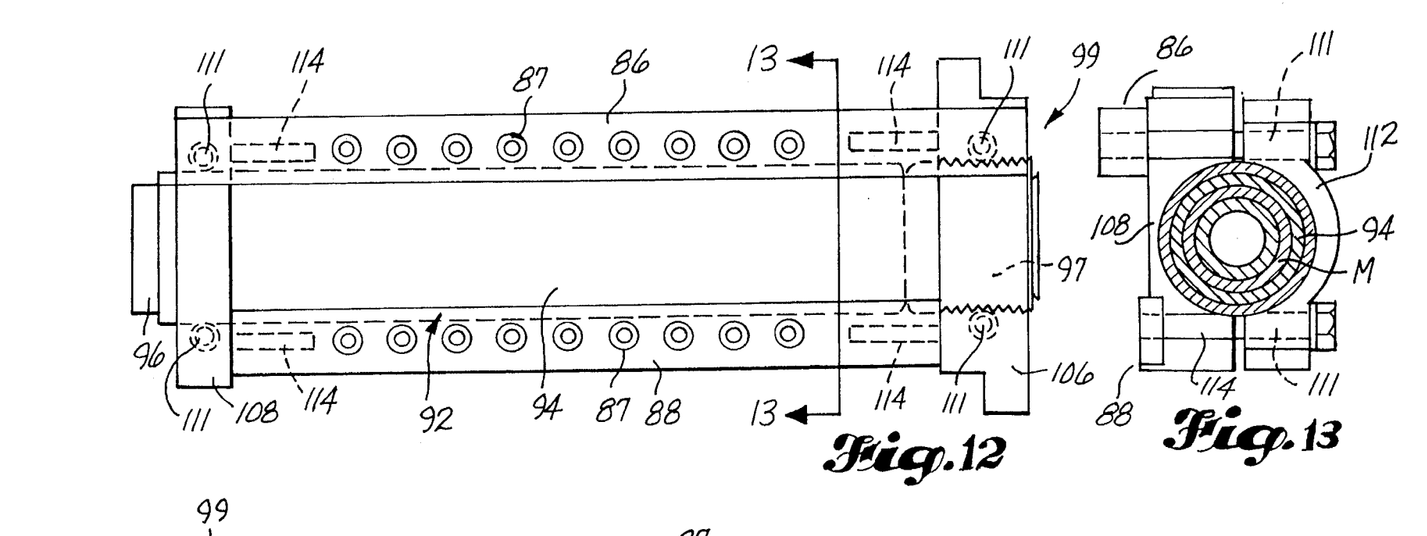
FIG. 12 is a top plan view of a cylinder barrel of the linear hydraulic motor, showing supporting framework for a floor slat member.
FIG. 13 is a sectional view taken through the cylinder barrel substantially along lines 13—13 of FIG. 12.
Figure 14:
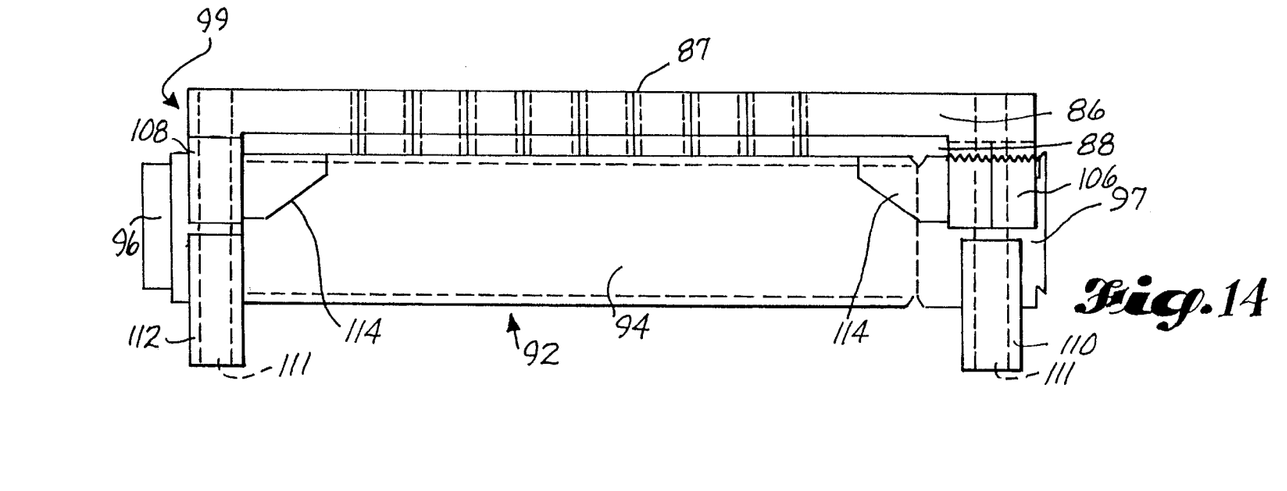
FIG. 14 is a side elevational view of the cylinder barrel of FIG. 12, with the bolts' heads holding the end clamps together not shown.

Referring to FIGS. 12–14, each cylinder barrel 94 is mounted to a frame 99 comprising a first upper end clamp 106 and a second upper end clamp 108, a first lower end clamp 110, and a second lower end clamp 112, each of which is constructed to cradle cylinder barrel 94. Bolts 111 fasten first upper clamp 106 to first lower clamp 110 and second upper clamp 108 to second lower clamp 112. Elongated shoe pads 86, 88 are part of frame 99 and span between and connect first upper clamp 106 and second upper clamp 108. Countersunk bolts 87 (shown less countersunk bolt heads) secure floor members 10, 10' to the shoe pads 86, 88. Shoe pads 86, 88 are, in turn, connected at their ends to the upper end clamps 106, 108. A plurality of angle brackets 114 provide additional structural support to frame 99. The basics of cylinder drives are described in greater detail in my prior U.S. Pat. No. 5,193,661, granted Mar. 16, 1993, and entitled, "System of Linear Hydraulic Motors."

Figure 15:
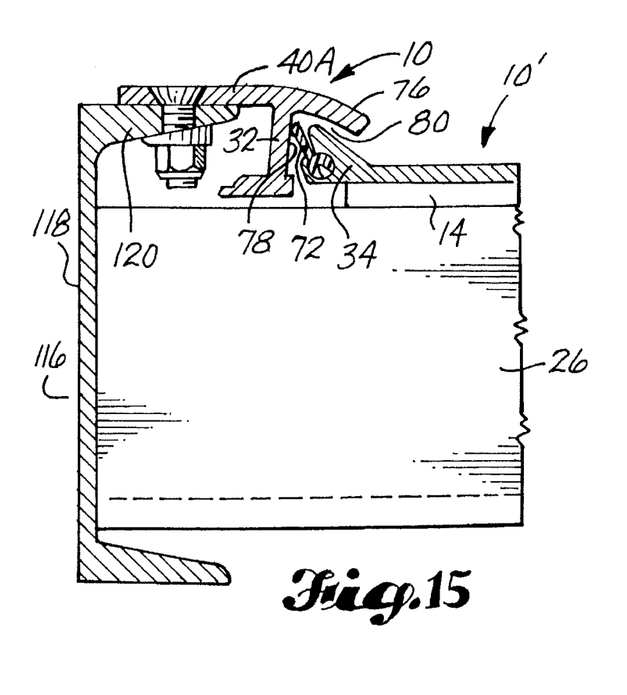
FIG. 15 is a fragmentary sectional view taken substantially at circle 15 in FIG. 3, such view showing a fixed floor slat member attached to one side of the conveyor floor frame.
Figure 16:
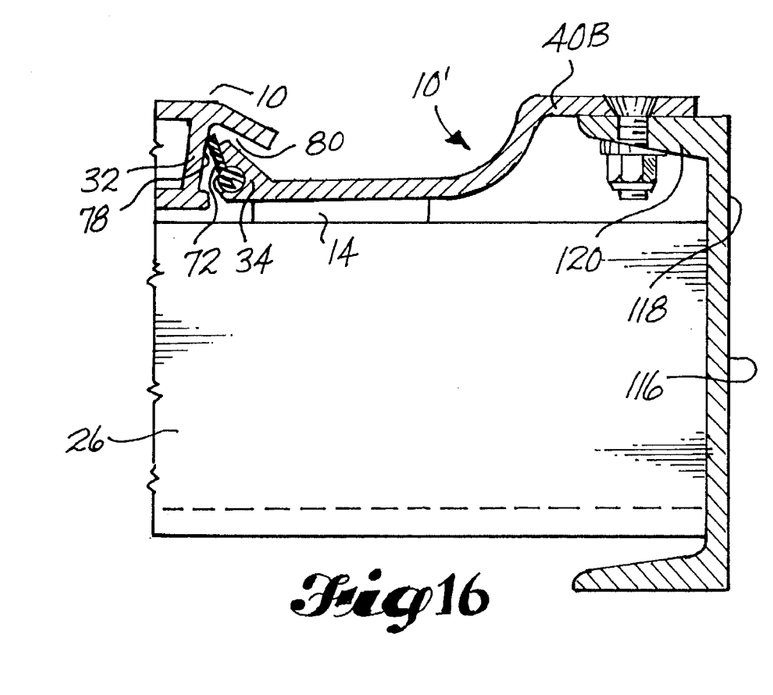
FIG. 16 is a fragmentary sectional view taken substantially at circle 16 in FIG. 3, such view showing a fixed floor slat member attached to the other side of the conveyor floor frame.
Figures 17, 18, 19:
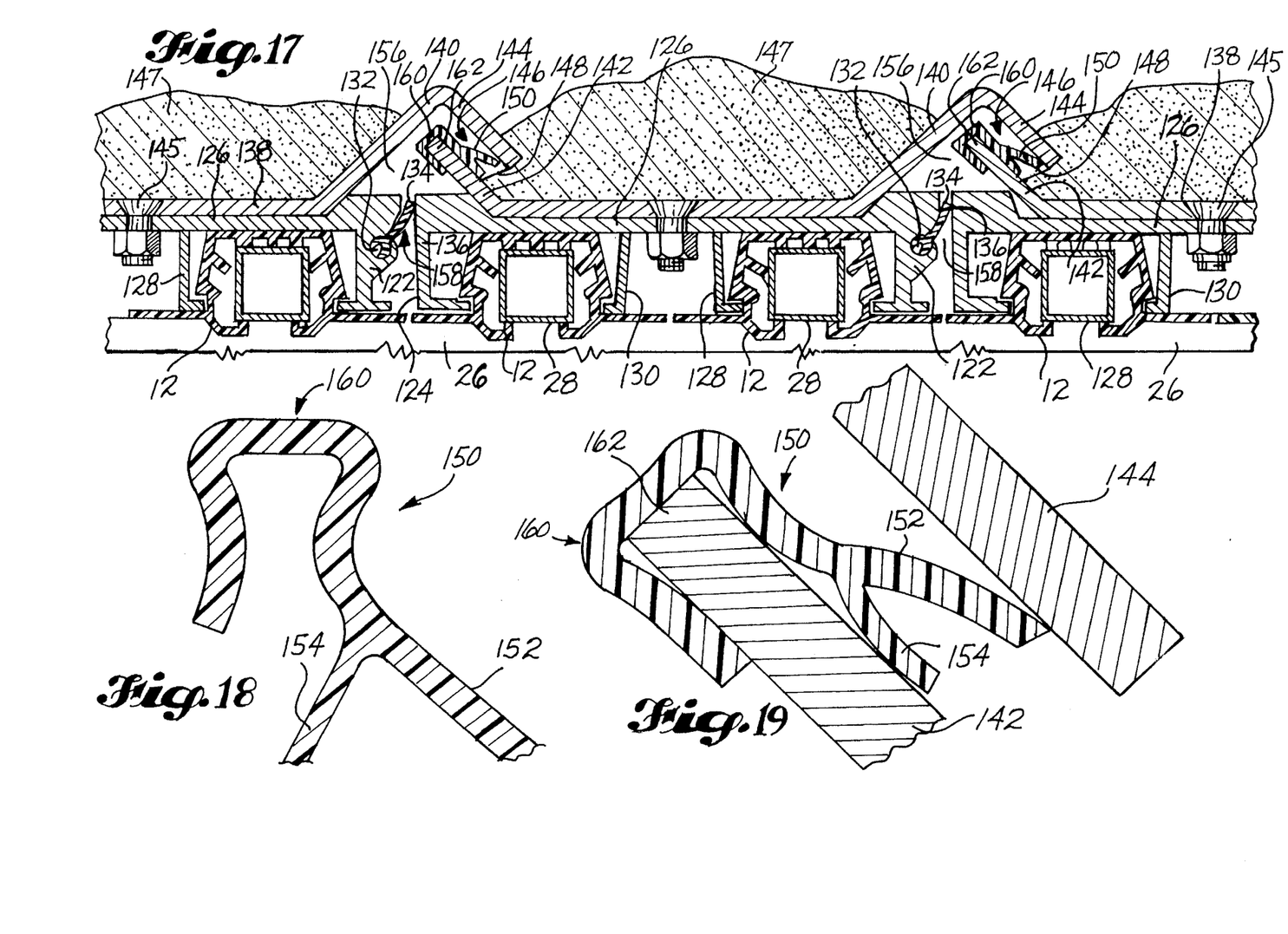
FIG. 17 is a sectional view of an alternate embodiment of a floor slat member, such view showing overlaying channels including an overhanging side flange, and such view showing an angle of repose formed in the material to restrain the material, and showing the side flange positioned to protect an overlay seal member and a lower second seal member.
FIG. 18 is an enlarged section view of the overlay seal member.
FIG. 19 is an enlarged section fragmentary view of the overlay seal member in relationship to a side flange and a second wall portion.

In a typical installation, approximately fourteen side-by-side floor slat members 10, 10' are placed in and form the floor of a material container 116, as shown in FIG. 3. Container 116 may be part of a stationary installation or may be a rail car, a truck box, a trailer box, or a cargo container. Referring to FIGS. 15–16, floor slat members 10 attach to a sidewall 118 of container 116 via a flange 120. The top panel 40 of a floor slat member is cut to form a partial top panel 40A. Partial top panel 40A mounts on flange 120 and is bolted together at the left side of container 116. Partial top panel 40A is cut to remove the I-beam region 60, as depicted in FIG. 15. Referring to the right side of container 116, as shown in FIG. 16, another partial top panel 40B is nearly the mate to partial top panel 40A. Flange 120 is attached to sidewall 118, preferably by a weld. Referring to FIG. 17, floor slat member 11 is an alternative embodiment. This embodiment was originally disclosed in my aforementioned co-pending application, Ser. No. 08/304,404. Floor slat member 11 has laterally spaced-apart first and second sidewalls 122, 124 with a top panel 126 connecting the two sidewalls. Extending longitudinally of the top panel 126 are two leg portions 128, 130 that are laterally spaced apart and in between the first and second sidewall 122, 124. Floor slat member 11 snaps over two slide bearings 12, which is the same bearing used in the first embodiment for floor slat member 10. First sidewall 122 includes a narrow channel 132 to hold a lower second elastomeric elongated seal strip member 134. Second elongated seat strip member 134 contacts a seal member receiving surface 136 on second sidewall 124 of an adjacent floor member 11'.

Resting on top portion 126 is an upwardly-opening overlay channel 138 having a bottom panel 139. An upwardly extending first wall 140 extends from one end of bottom panel 139, and an upwardly and outwardly extending second wall 142 extends from the other end of the bottom panel 139. Extending outwardly and downwardly from first wall 140 is a side flange 144 that overhangs second wall 142 of an adjacent overlay channel 138' of an adjacent floor member 11'. Overlay channel 138 is attached to top portion 126 of floor slat member 11 via a bolt 145, although other attachment methods may be used.

Side flange 144 overhangs second wall 142 to form a narrow gap 146. Abrasive debris/particulates 147 resting on overlay channel 138 forms an angle of repose 148 between side flange 144 and second wall 142. An elastomeric overlay seal 150 (better depicted in FIGS. 18 and 19), having two legs 152, 154 span gap 146 and confront side flange 144 and second wall 142 in a wishbone-like design, restraining debris/particulates 147 from entering an open area 156 underneath second wall 142, side flange 144 and first wall 140. Area 156 is directly overhead a gap 158 between adjacent floor members 11, 11'. Second elongated seal strip member 134 spans gap 158 to confront second sidewall 124. Overlay seal 150, therefore, protects second seal member 134 and gap 158 from abrasive debris, and also the hydraulic drive unit members below floor member 11, not shown. Overlay seal 150 also has a curved tail end 160 which covers an end 162 of second wall 142 to further protect floor slat member 11 from debris/particulates 147 and friction during back and forth movement.

Figure 6:
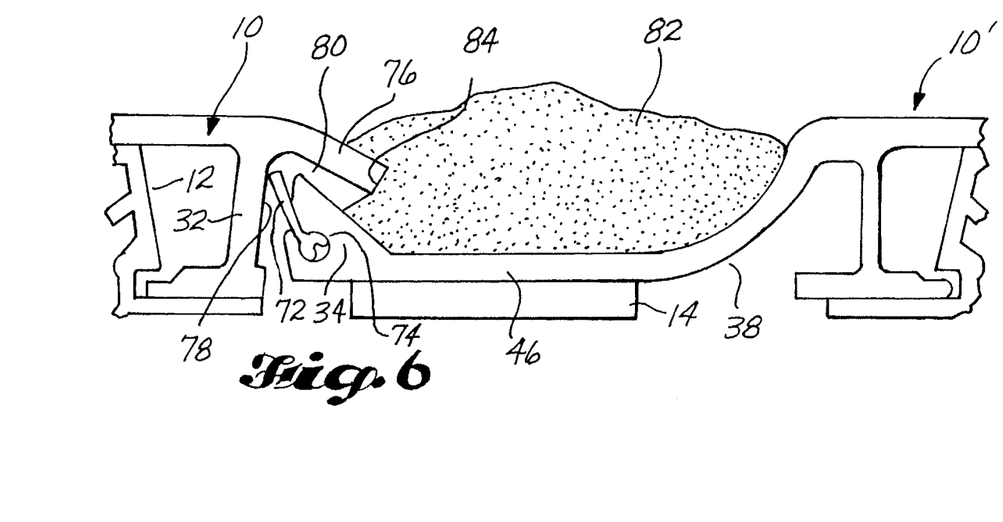
FIG. 6 is a fragmentary end elevational view taken substantially along lines 6—6 of FIG. 2, such view showing parts of a floor slat member and an adjacent second floor slat member, and such view depicting particulates in an upwardly opening channel space and showing the particulates restrained by an angle of repose of the particulates from entering a gap between the floor slat members.
Figure 7:
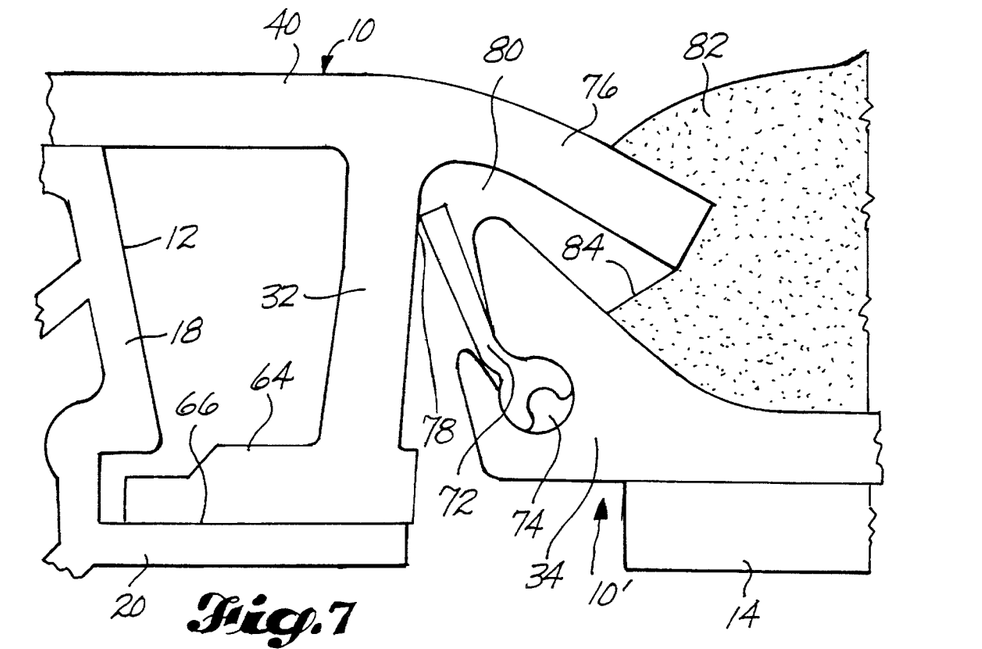
FIG. 7 is an enlarged scale fragmentary end elevational sectional view depicting a seal member of a second floor slat member contacting a seal member receiving surface of an adjacent first floor slat member and depicting a gap that is generally vertically between an overhanging side flange on the first floor slat member and a sidewall of the adjacent second floor slat member, such view showing the granular material assuming an angle of repose at the outer edge of the overhanging side flange.
Figure 8:
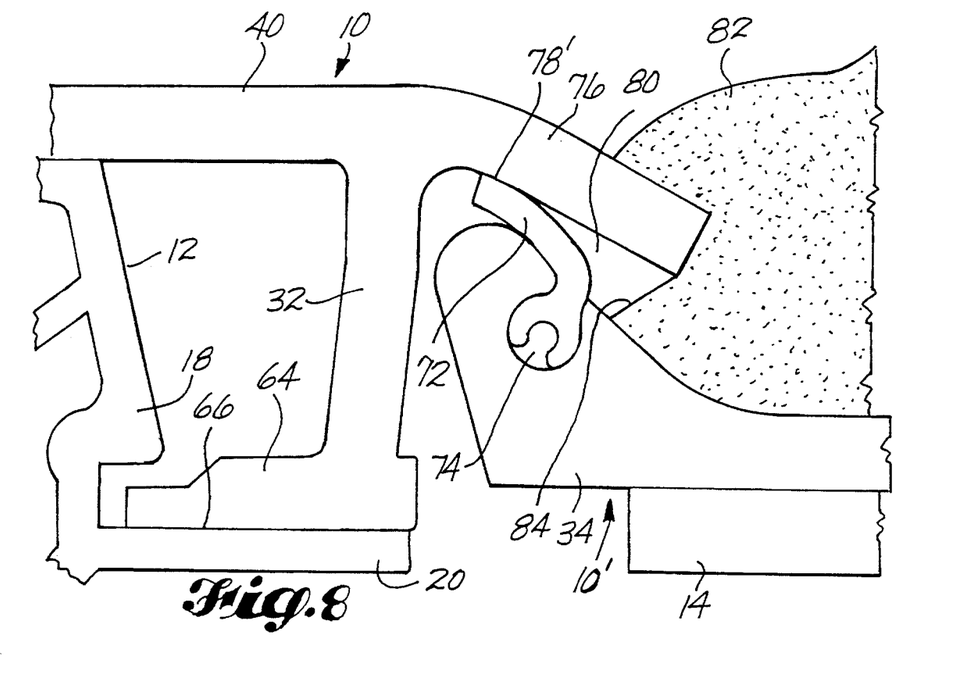
FIG. 8 is a view like FIG. 7 but of an alternate seal member design including a seal receiving surface on the bottom of the side flange and a seal member angled upward and outward to contact the new seal member receiving surface.

Another feature of the integral one-piece floor member as depicted in FIGS. 1–3 and 5–8 is that debris and liquids collect in the bottom panel 46, as inferred from FIG. 6. As floor slat members 10 move, liquid is channeled and removed out the end of the container.

All of my prior patents mentioned in this application, and my co-pending application, Ser. No. 08/304,404, are hereby incorporated into this application by this reference.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. An elongated floor slat member for a reciprocating floor conveyor, comprising:

a first sidewall and an oppositely situated second sidewall;

an integrally formed downwardly opening first channel portion and an upwardly opening second channel portion;

said first channel portion including a seal member receiving surface at the first sidewall; and said second channel portion including a bottom panel for holding and channeling material and a seal member at the second sidewall.

2. An elongated floor slat member according to claim 1, including a generally vertical leg extending longitudinally of the floor slat member and positioned laterally between the first and second sidewalls.

3. An elongated floor slat member according to claim 2, wherein said generally vertical leg and said first sidewall include laterally inwardly projecting bottom flanges that are in coplanar parallelism with each other.

4. An elongated floor slat member according to claim 3, wherein said bottom flanges are vertically offset below and are parallel with the bottom panel of said second channel portion.

5. A reciprocating floor conveyor having a plurality of elongated floor slat members adjacent each other and which are advanced in a first direction to convey a load and are retracted in the opposite direction, each said elongated floor slat member comprising:

a pair of opposite sidewalls extending longitudinally of the elongated floor slat member, each said sidewall having a top and a bottom;

a leg portion extending longitudinally of the elongated floor slat member, laterally between said sidewalls, said leg portion including a generally vertical web having a top and a bottom;

a first channel portion extending generally perpendicular from the top of said web, said first channel portion including said leg portion, a first of said sidewalls and a top panel, said top panel interconnecting the top of the first sidewall and the top of said web;

a second channel portion extending generally perpendicular from the bottom of said web, said second channel portion including a second of said sidewalls, a bottom panel and a channel wall, said channel wall extending downwardly from a connection with the top panel to a connection with said bottom panel, said bottom panel interconnecting the channel wall and the bottom of the second sidewall;

said top panel including a laterally projecting side flange that extends laterally outwardly beyond the first sidewall;

an elongated seal member receiving surface below said side flange; and an elongated seal member supported on the second sidewall and extending into sealing contact with the seal member receiving surface of an adjacent floor slat member;

wherein the side flange of a first elongated floor slat member overhangs the second sidewall and the elongated seal member of an adjacent second elongated floor slat member, and wherein the seal member of said second elongated floor slat member contacts the seal member receiving surface of said first elongated floor slat member.

6. A reciprocating floor conveyor, according to claim 5, wherein the side flange slopes downwardly and outwardly from the top of the first sidewall.

7. A reciprocating floor conveyor, according to claim 5, wherein said top panel extends laterally from the top of said web in a direction opposite of said first channel to form a transition portion which connects to said channel wall.

8. A reciprocating floor conveyor, according to claim 5, wherein the bottom of said web includes a bottom flange extending perpendicular to said web.

9. A reciprocating floor conveyor according to claim 7, wherein said leg portion and portions of said top panel including said transition portion together form an I-beam extending longitudinally of the floor slat member.

10. A reciprocating floor conveyor, according to claim 8, wherein said first sidewall includes a bottom flange that is in coplanar parallelism with the bottom flange of said web.

11. A reciprocating floor conveyor according to claim 10, wherein the bottom flange of said web and the bottom flange of said first sidewall are in offset parallelism with the bottom panel of said second channel.

12. A reciprocating floor conveyor according to claim 5, wherein the seal member receiving surface is on said first sidewall.

13. A reciprocating floor conveyor, according to claim 5, wherein the seal member receiving surface is a lower surface on said side flange.

14. A reciprocating floor conveyor according to claim 5, wherein said second sidewall includes an elongated seal member retaining channel and wherein a lower portion of said elongated seal member is received within said retaining channel.

15. A reciprocating floor conveyor, comprising:

a plurality of elongated floor slat members which are advanced in a first direction to convey a load and are retracted in the opposite direction, each said elongated floor slat member comprising first and second sides and integrally formed first and second channel portions, said first channel portion including a top panel with a bottom surface and a downwardly opening channel space and said second channel portion opening upwardly and including a bottom panel with a bottom surface;

a plurality of elongated guide beams, one for each floor slat member;

first support bearings on said guide beams, each said first support bearing being received within the channel space of the first channel portion of a related floor slat member;

wherein said first support bearings contact the bottom surfaces of the top panels of the first channel portions of said floor slat members; and second bearings contacting the bottom surfaces of the bottom panels of the second channel portions of the floor slat members.

16. A reciprocating floor conveyor according to claim 15, wherein said first channel portion includes a first sidewall and a seal member receiving surface and said second channel portion includes a second sidewall having a seal member.

17. A reciprocating floor conveyor, according to claim 15, wherein a generally vertical leg extends longitudinally of each elongated floor slat member laterally between the first and second sides of the floor slat member.

18. A reciprocating floor conveyor, according to claim 17, wherein said leg in combination with the top panel of the first channel portion of the floor slat member form an I-beam extending longitudinally of said floor slat member.

19. A reciprocating floor conveyor, including a first elongated floor slat member and an adjacent second elongated floor slat member, each said elongated floor slat member comprising:

a first and second sidewall, opposite each other and extending longitudinally of the elongated floor slat member;

integrally formed first and second channel portions;

said first channel portion including a downwardly opening channel space, a top panel and said first sidewall;

said second channel portion including an upwardly opening channel space, a bottom panel and said second sidewall;

said top panel of the first channel portion including a side flange that slopes downwardly and outwardly from the top panel, said side flange including an outer edge;

said first sidewall including a seal member receiving surface below the side flange and spaced vertically above the outer edge of said side flange; and said second sidewall including a seal member;

wherein the side flange of said first elongated floor slat member overhangs the second sidewall and the seal member of said second elongated floor slat member;

wherein the seal member of said second elongated floor slat member contacts the seal member receiving surface on the first sidewall of said first elongated floor slat member;

wherein the second sidewall of the second floor slat member and the side flange of the first floor slat member form a gap leading from the channel space of the second channel portion to the contact location of the seal member with the seal member receiving surface; and wherein the side flange of the first floor slat member and the second sidewall of the second floor slat member are so situated that the angle of repose of particulate material collected in the upwardly opening channel space of said second channel portion will restrain such material from upward movement into said gap.

20. A reciprocating floor conveyor, according to claim 19, wherein each floor slat member includes a generally vertical support leg extending longitudinally of the floor slat member between said first and second sidewalls, said support leg having a vertical web and at least one bottom flange, said web, bottom flange, and portion of the floor slat member to which the web is connected forming a floor member stiffenging beam section.

* * * * *